Figure 1:
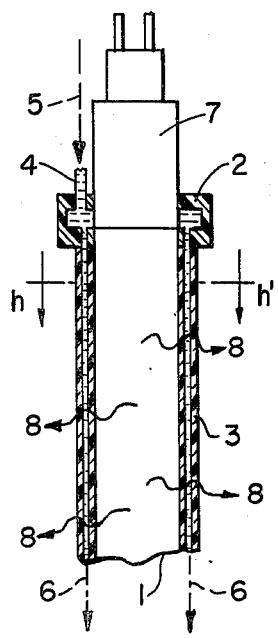

United States Patent [19]

Boucher

[11] 3,926,556
[45] Dec. 16, 1975

[54] BIOCIDAL ELECTROMAGNETIC SYNERGISTIC PROCESS

[76] Inventor: Raymond Marcel Gut Boucher, 200 E. 64th St., New York, N.Y. 10021

[22] Filed: May 30, 1973

[21] Appl. No.: 365,287

[52] U.S. Cl............ 21/54 R; 21/102 R; 21/DIG. 2; 426/241; 426/248
[51] Int. Cl.². A61L 13/00; A23C 3/06; A23L 3/28; A23L 3/32
[58] Field of Search........... 21/DIG. 2, 54 K, 102 R; 426/237, 241, 248, 234; 250/432

[56] References Cited
UNITED STATES PATENTS

| | | | |
|---|---|---|---|
| 1,132,266 | 3/1915 | Henri et al. | 250/432 X |
| 1,863,222 | 6/1932 | Hoermann | 21/54 R |
| 1,881,310 | 10/1932 | Coatsworth | 21/DIG. 2 X |
| 2,132,431 | 10/1938 | O'Brien | 250/434 |
| 2,260,823 | 10/1941 | Bettis | 250/434 X |
| 2,384,778 | 9/1945 | Whitman | 21/102 R |
| 2,485,267 | 10/1949 | Ellner | 250/434 |
| 2,588,716 | 3/1952 | Gochenour et al. | 21/102 R |
| 2,651,724 | 9/1953 | Hall | 21/102 R |
| 2,833,657 | 5/1958 | Copson | 426/241 |
| 3,272,636 | 9/1966 | Fehr et al. | 426/234 |
| 3,439,510 | 3/1969 | Gray | 21/54 R UX |
| 3,494,723 | 2/1970 | Gray | 21/54 R |
| 3,494,724 | 2/1972 | Gray | 21/54 R |
| 3,531,950 | 10/1970 | Foerstner | 219/10.55 X |
| 3,544,751 | 12/1970 | Valles | 219/10.55 |
| 3,676,058 | 7/1972 | Gray | 21/54 R |
| 3,737,608 | 6/1973 | Nagao et al. | 219/10.55 |
| 3,749,874 | 7/1973 | Edgar | 219/10.55 |
| 3,753,651 | 8/1973 | Boucher | 21/54 R |

FOREIGN PATENTS OR APPLICATIONS

| | | | |
|---|---|---|---|
| 496,364 | 9/1953 | Canada | 426/237 |

*Primary Examiner*—Barry S. Richman
*Assistant Examiner*—Arnold Turk
*Attorney, Agent, or Firm*—Shoemaker and Mattare, Ltd.

[57] ABSTRACT

Method and apparatus for the low temperature intermittent or continuous destruction of microorganisms such as viruses, bacteria and fungi, in solid or liquid materials, expecially for decontamination of organic and biological fluids, wherein the material is subjected to the synergistic effect of combined ultraviolet energy having a wave length of from about 40 Angstroms to about 3100 Angstroms and microwave energy having a wave length of from about 1 cm to about 35 cm, and while the temperature is maintained below about 100°C.

8 Claims, 20 Drawing Figures

U.S. Patent Dec. 16, 1975 Sheet 2 of 5 3,926,556

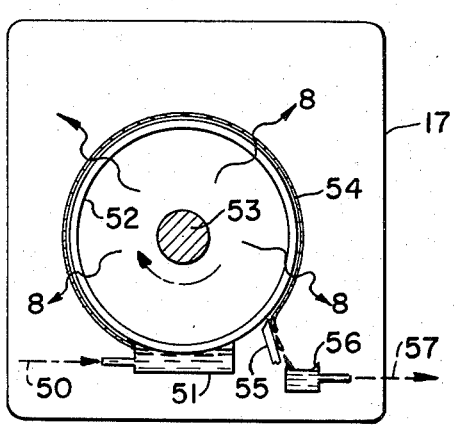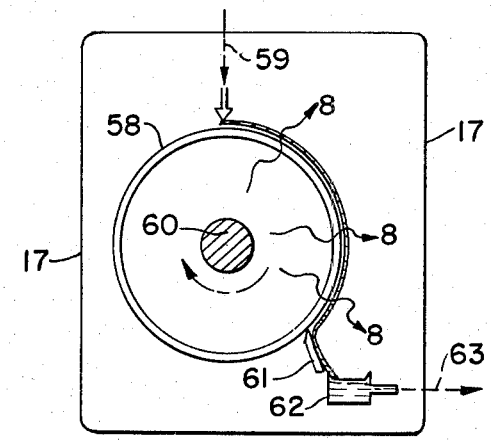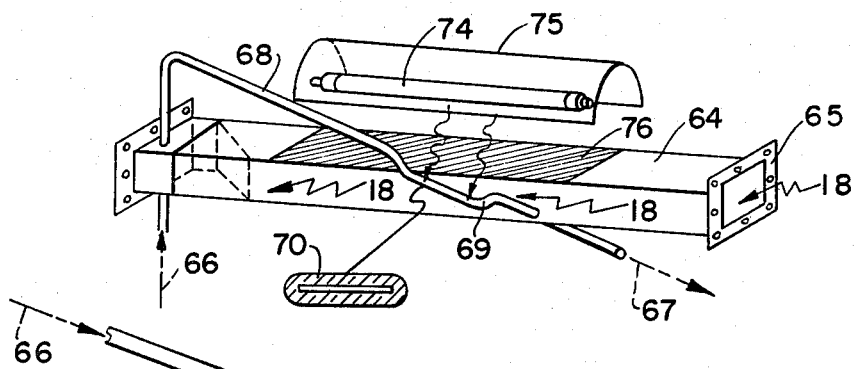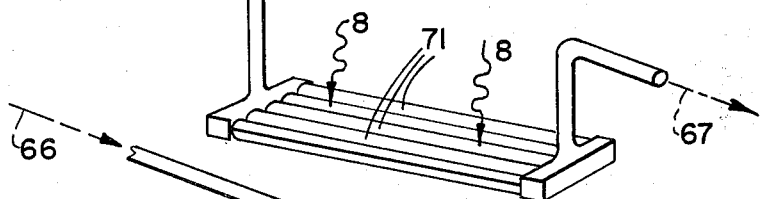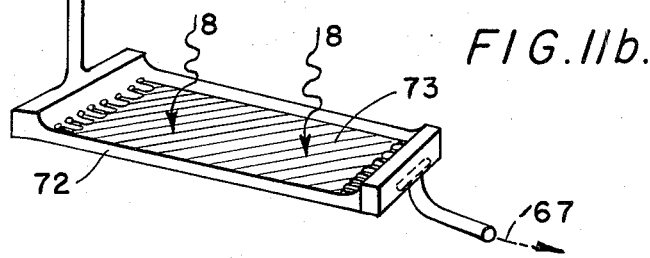

BIOCIDAL ELECTROMAGNETIC SYNERGISTIC PROCESS

This invention relates to a method and apparatus for the intermittent or continuous destruction of microorganisms in solid films or liquids especially in organic and biological fluids. The method is based on the biocidal synergism observed when combining high intensity ultraviolet and microwaves irradiation of microbiologically contaminated fluids or solid films.

In the past, several attempts were made to use either microwaves or ultraviolet irradiation to destroy microorganisms in solids or liquids. Both techniques, as we shall see, had their own limitations and none of them individually, for instance, solve difficult problems such as the complete destruction of hepatitis virus in blood plasma. In the case of microwaves, for instance, it was due to the fact that the radiant energy exhibited a deleterious effect on the medium of dispersion before achieving complete kill of the liquid borne viruses. It is the object of the present invention to show that the combined effects of electromagnetic energy from both the ultraviolet and microwaves regions can enable complete destruction of microorganisms such as viruses without drastically affecting the properties or physiological characteristics of the medium containing or supporting said microorganisms or viruses. To aid in the understanding of the present invention we shall first discuss the mechanism by which both microwaves and ultraviolet energy are believed to destroy microorganisms in liquids.

As is well known, microwave energy is coherent electromagnetic energy. By this, we means that it is ordered. In other words, we can readily identify its characteristics and can control it with precision. To the contrary, thermal energy, for instance, has random, disordered characteristics which are not so easily controlled.

Although the term microwave, in general, may cover a rather wide range of frequencies (from 100 MHz to several hundred thousand MHz) the following discussion deals mainly with frequencies whose wave length is between 1 cm and 35 cm. Any inert or biological material irradiated by microwaves is submitted to two different effects: the first of a thermal and the second of a non thermal nature.

Most of past attempts to use microwaves for sterilization or microbiological decontamination were based upon the thermal effects of microwaves (i.e. the degradation of electromagnetic energy into heat). The mechanism through which microwave heating occurs at the above mentioned frequencies is based upon the dipole moment, or "polarization" of the molecules of the irradiated substance. When the polar molecules (absorbed water in cellular organisms for instance) are subjected to a strong alternating field, their rapid reorientations within the field create some kind of molecular motion resulting in internal friction and heat. In a more precise sense, one could say that heat is produced through the conversion of the potential energy of polarization into random energy. It is important to note that with microwave heating, no contact with the substance itself is required. In other words, the transfer of energy takes place directly without the necessity of an intermediate medium such as a hot surface or a high temperature air stream. Energy transfer occurs wherever the field penetrates.

Microwave heating eliminates the inherent inefficiency of transferring heat from an external source to the processed load. Since microwave energy can be switched on to full power levels and off again by simply flipping a switch, the time lags associated with thermal processes are not present either.

In the first approximation, the amount of power that can be delivered to a standard unit of volume of microorganisms containing water is proportional to the product $e \cdot \tan Sf E^2$ where $e$ is the permittivity (the amount of electric field that is produced by the molecules for a given applied field), $\tan S$ is the loss tangent of the material (proportional to the conductivity), $f$ is the frequency and $E$ is the electrical field strength. Since the produce $e \cdot \tan S$ will vary for each microorganisms species, different irradiation times will be needed for sterilization (i.e. enzyme inactivation, protein denaturation or both) through a purely thermal effect when using a fixed output power at a fixed frequency. No matter how fast and efficient is the energy coupling, the conversion of microwave energy into heat bears most of the limitations attached to thermal sterilization methods. This explains why the use of microwaves for liquids decontamination has always been quite limited for industrial applications. Raw milk or fruit juices sterilization were, for instance, potentially attractive for microwave processing but complete destruction of microorganisms could only take place after some proteins in the liquid were partially or completely denatured (changing taste).

To avoid this difficulty Oscar S. Gray (U.S. Pat. No. 3,494,723 and 3,439,510) suggested using powerful and expensive cooling systems which would quickly decrease the temperature as soon as the heat sensitive microorganisms would have been destroyed. In practice such cooling methods, using a coolant gas, are quite uneconomical and extremely difficult to handle since the point at which microorganisms are killed or inactivated without affecting the surrounding medium is never known. For most industrial applications this approach is merely impossible because heat resistant microorganisms will in any case necessitate more thermal energy than the surrounding medium molecules can bear no matter the heat transfer cooling rate. This is particularly true for biological and physiological fluids containing heat resistant pathogens (sporulated bacteria) because one cannot avoid the premature destruction of numerous critical heat labile molecules constituting the bulk of the irradiated fluids (serum, blood plasma, proteins, etc.).

It is therefore obvious that a technique based entirely upon the degradation of microwave energy into heat has a limited appeal for sterilizing biological or physiological fluids.

What seemed worth more attention was the long neglected "non thermal" effect of microwaves. As previously stated the mechanism through which microwaves affect microorganisms is based upon the dipole moment, or polarization of certain molecules of the irradiated substance. When the polar molecules (e.g., water in protoplasm) are subjected to a strong alternating field, their rapid reorientations within the field first create some kind of internal turbulence which can result in bonds breaking, electrical charges, pH modifications (ionic conduction), molecular rearrangements, membrane permeability alteration, etc., before finally turning into kinetic energy and heat. During the initial phase of turbulent agitation and before a significant amount of heat develops drastic changes in the microorganism metabolism could be observed. This corresponds to what is known as the non thermal effect of microwaves.

In short, thermal effects are those which are not directly caused by the microwave field, but rather by prolonged kinetic motion whereas non thermal effects are those which result directly from the interaction of the electromagnetic field with the molecules, causing effects that cannot be created by thermal action alone.

Although very difficult to study separately, the non thermal effects of microwaves (and electromagnetic radiation in general) have been established beyond doubt and thoroughly investigated by several authors (C. M. Olsen, Journ. Microwave Power, 1–2, 45–56, 1966). For instance, microspores of Fusarium solanie f. phaseoli in water suspension (Baker, K. F. and Fuller, W. H., 1965) were irradiated at 2450 MHz and compared with a treatment in water at a slightly higher temperature. Spores germination data showed that thermal treatment curves were quite conventional in shape but microwave treated spores germinated on an "all or nothing" basis. The data therefore suggested that microwaves may affect a metabolic system distinct from that of thermal energy.

In another experiment C. M. Olsen suspended Saccharomyces-cerevisiae spores in a thin silicone oil and irradiated the suspension by placing it in a plastic tube inside a wave guide. The chosen silicone oil was selected because it does not heat readily in a microwave field (i.e. it is relatively lossless) and also because it was a very good heat transfer medium. Since the suspending liquid would not heat to any extent, it was thought that any effects of the treatment would be due to non thermal microwaves rather than a possible heating of the suspending fluid and subsequent heat transfer to the organism.

C. M. Olsen first showed that 2450 MHz microwaves (power output 200 watts, irradiation time 3 minutes) did directly couple to the microorganisms because the temperature raised up to 8°C. When the microwaves treated spores were recovered and their rate of respiration determined it was found that they consumed 0.27 $\mu l$ $O_2$/min while untreated cells consumed 1.75$\mu l$ $O_2$/min in 30 minutes. When the oil, containing the spores, was heated to the same temperature with a water bath far higher rates of respiration than with microwaves were always observed.

A possible explanation of the non thermal effect of microwaves could lie in the various degree of absorption of microwave energy by certain key molecules such as nucleic acids. In the very high frequency range D. E. Dodds and S. J. Webb showed (Nature, Ser. No. 218,374, 1968) that certain microwave frequencies interfered with the growth of microbial cells and inhibited or stimulated the biosynthesis of some macromolecules. In addition, the particular metabolic process affected and the manner in which it was changed was found to be frequency dependent (S. J. Webb and A. D. Booth, Nature, Ser. No. 222,1199, 1969). More recently it was even found possible (Science, Volume 174, 72–4, 1971) to use microwave absorption in the 66 to 76 GHz range to differentiate the content of DNA and RNA in both normal cells and tumor cells. The heating effect is insignificant in the above reported experiments and could not furnish an explanation for the different results observed from the microwaves energy absorption view point.

In another series of experiments W. J. Peters and his collaborators (Microwaves 14, January, 1971) at the Banting Institute of Toronto University reported that 2450 MHz radiation could inhibit the growth of several kinds of mammalian cells. These authors used a system to draw off excess microwave heat and concluded that the inhibitory effect was not caused by heating. More recently J. R. Wayland and his collaborators (Journ. Microw. Power, 7, 4, 1972) also showed that tissue damage to mesquite leaves exposed to 2450 MHz could not be explained by temperature raise but were apparently due to non thermal microwave effects. Regarding viruses and enzymes it has long been reported by A. S. Presman (1963) and G. H. Edwards (1964) that they could be inactivated by microwaves at temperatures substantially lower than their reported inactivation thermal death point.

Having now substantiated the "non thermal" biocidal action of microwaves we shall briefly recall how ultraviolet radiation works as a biocidal agent.

The sterilizing action of electromagnetic radiations in the ultraviolet region (especially between 2000 A. and 3100 A.) is due to the release of powerful quantas of energy called photons. The energy of a quantum E is given by the product of $h \times f$, that is to say, $E=hf$ or $E=hc/\lambda$, where $h$ is the well known Planck's constant ($6.62 \times 10^{-27}$ erg-second) and $f$ is the frequency of the radiation. From the above formula one can see that the energy of an individual photon increases with the frequency of the radiation and decreases with its wave length. In other words, the photons emitted in the ultraviolet range become more destructive as the emission frequency is raised. Maximum biocidal effectiveness is about 2900 to 3100 A., with progressively lower effectiveness through the visible light range.

The release of high energy photons in the "abiotic" region (i.e. between 2000 A. and 3100 A.) is believed to produce strong biocidal effects because it corresponds to a maximum of absorption of DNA (deoxyribonucleic acid) and other nucleic acids. This had been first suggested by F. L. Gates and was later supported by extensive laboratory studies which definitively showed a parallel between the biocidal action curve and the ultraviolet absorption curve of nucleic acids or nucleic acid components.

The biocidal effect of ultraviolet is therefore regarded as the result of chemical modifications produced at the molecular level (formation of thymine dimer, for instance, in DNA) by the quanta of energy absorbed in the irradiated material. To obtain a strong biocidal effect one must release a certain number of quanta which must penetrate inside the processed microorganism and be of sufficient magnitude to initiate and maintain a given photoreaction. The amount of quanta with sufficient energy which can be released through a liquid depends, of course, on the degree of absorption of the ultraviolet energy through the liquid.

As an example let us recall that in a non turbulent volume of water it has been shown that ultraviolet transmission t varies exponentially with the liquid depth $d$ and the absorption coefficient $\alpha$ according to the following formula:

$$t = e^{-\alpha d}$$

One can therefore understand that with most non transparent organic liquids an efficient biocidal effect can be obtained only through the processing of thin liquid films. In the applications object of our invention the thickness of the liquid film is most of the time comprised between 0.05 mm and 13 mm. As an example a preferred thickness for whole blood or plasma blood irradiation is 0.1 mm.

From the above considerations it is now easier to understand why the combined action of ultraviolet (40 to 3100 A wave length) with non thermal microwaves (wave length between 1 cm and 35 cm) can produce a synergistic biocidal effect which tremendously extends the processing range of these two forms of electromagnetic energy. When irradiating a thin film of liquid, ultraviolet photons can quickly destroy viruses at intensities higher than 16 mW/sec/cm$^2$ but there is often a "tailing effect" which necessitates very long exposure to achieve complete killing of all microorganisms. Adding microwaves irradiation (to benefit from non thermal effects) will weaken the resistance of the microorganism by absorption of a critical amount of electromagnetic energy in nucleic acids thus providing extra energy and eliminating the "tailing effect". While non thermal microwaves alone would seldom provide a 100% kill the combination of ultraviolet and microwaves would result in a fast and complete destruction of all microorganisms. The main advantage of non thermal microwaves energy lies also in the fact that it does not substantially modify heat labile molecules such as proteins in organic fluids. One can therefore adjust microwaves irradiating conditions to maintain a short duration peak temperature below 100°C to avoid destroying heat labile components and then increase to the highest permissible limit the amount of ultraviolet photons to accelerate sterilization rate. The intensity of the ultraviolet irradiation is not critical because in general it does not significantly alter the medium of dispersion. Most of the time the suitable amount of ultraviolet intensity is determined by economic consideration. It ranges from 1 to 30 mW/sec/cm$^2$. Also, the microwave energy density level inside the processing cavity varies up to about 0.025 W/cm$^3$ and is preferably greater than about 0.001 W/cm$^3$.

Having described the principle behind the biocidal synergistic method object of our invention, we shall now give a few non limiting examples which clearly show the efficacy and uniqueness of our invention.

EXAMPLE 1

One of the most important problems in blood transfusion today is the risk associated with the transmission of some viruses (hepatitis for instance) from a donor to a patient. The only method of blood plasma sterilization which had been proven clinically safe was the combined treatment by ultraviolet and betapropiolactone. This technique developed by G. A. LoGrippo and his collaborators in 1954 was successfully used in several countries but was not officially approved in the USA due to the discovery in the 60's that betapropiolactone could, under certain conditions, produce skin sarcomas and carcinomas in the mouse.

Today no method is available to safely destroy all traces of viruses in blood plasma. The problem in the absolute sterilization of the plasma against the hepatitis virus is to be able to enhance virucidal effectiveness while maintaining minimal destruction of the labile components of plasma. In other words, one must destroy all viruses while not markedly changing the physiologic and physical characteristics of the plasma. The method object of the present invention will achieve such a goal as demonstrated by the following data.

Due to the difficulties of experimentation on humans the method object of our invention was tested with artificially infected blood plasma. The plasma was pooled from 28 day old outdated blood and from fresh plasma remaining after use of packed erythrocytes. The pooled plasma was filtered through millipore filters (0.22 micron) to eliminate any suspended cellular matter. Aliquots of the plasma pool were seeded with E. coli $T_3$ bacteriophage before the comparative studies were made. The advantage in using $T_3$ phage as an index of absolute sterilization of the plasma is the fact that every active virus particle can be counted while with animal viruses this is not possible. The plasma was seeded with purified $T_3$ phage in saline, the resulting virus titer being 1 to 10 million virus particles per ml of plasma.

The synergistic irradiation treatment was conducted in the apparatus shown in FIGS. 14 and 15 which will later be described. The ultraviolet intensity at the level of the plasma (after passage through the "vycor" capillary glass wall) was comprised between 16 and 25 milliwatts per second, per square centimeter (mw/sec/cm$^2$). The microwaves source was of the magnetron type (variable power output from 0 to 1200 watts). Under the loading experimental conditions the average amount of microwave energy radiated in the cavity was 650 watts. The average microwave density of energy in the cavity varied between 0 and 0.025 watt/cm$^3$. The magnetron emitted at a nominal frequency of 2450 MHz ($\pm$ 25 MHz). The plasma was continuously circulated into the processing unit by a peristaltic type blood pump. Temperature increases were measured by sensitive thermistors immediately before entering and after leaving the sterilizer. Temperature was raised in microwaves treatment by varying the plasma flow rate from 250 cc/min down to a few cc/min.

Table I shows the influence of various treatments on both the coagulation components of plasma and the virucidal effectiveness. Since the prothrombin time and the plasma clotting time are reflected in the percentage of clottable fibrinogen, these figures were omitted from Table I. Tests numbered 1, 2, 3 and 4 clearly show a fast destruction of coagulation components by heat and storage without achieving a substantial drop in viruses content. Tests numbered 5, 6 and 7 show that microwaves can produce a sharp increase of temperature in a short period of time but, although it is better than heat, this is not sufficient to seriously decrease the viruses content. It is however interesting to note that the percentage of clottable fibrinogen and the two-stage prothrombin values are not greatly modified by a sudden temperature rise due to a burst of microwaves energy. Higher the temperature peak the lower seems to be the viruses content. Test number 8 pertains to irradiation by ultraviolet alone at room temperature. Due to the fact that we used very small capillaries (0.1 mm diam.) made of ultraviolet transparent glass a large number of photons efficiently penetrated the plasma. This enabled us to lower the virus content from approximately 2 × 10$^7$ down to 600. The last series of tests (numbers 9, 10 and 11) clearly established the biocidal synergism of the combination microwaves plus ultraviolet. When these two types of electromagnetic radiation were combined the viruses count dropped sharply and it could be reduced to zero without significantly altering the heat labile coagulation components.

To emphasize the biocidal role of non thermal microwaves we conducted another series of experiments in which a cooling system was added around the processing cell. For good heat transfer and fast elimination of heat we used the 200 Dow-Corning silicone oil which was constantly recycled into a refrigeration unit. With this system it was possible to maintain the same microwaves energy density level (around 0.023

TABLE I

Effect of thermal energy, non thermal microwaves and ultraviolet on coagulation components and virus inactivation.

ducted by M. A. K. Hamid (J. Microwave Power, 4—4, 272—275, 1969) have also shown that to reach a satisfactory bacterial count through microwave heating of milk one must operate above 180°F with an exposure time comprised between 12 and 14 sec. Even at 180°F we must stress that the spore formers such as *Bacillus cereus* are not destroyed with a 14 second irradiation time. The economics of microwave milk pasteurization were not attractive under the conditions defined by M. A. K. Hamid and this author therefore suggested raising the boiling point of milk up to 250°F by processing

TABLE I

| Test Number | Duration | Maximum Temperature* | Type of Energy | Fibrinogen (mg/%) | Prothrombin 2 — stage (units/ml) | $T_3$ Phage plaque Counts/ml |
|---|---|---|---|---|---|---|
| Standard Controls | | | | 300 – 600 | 300 | $2 \times 10^7$ |
| 1 | 1 month | 37°C | thermal | 32 | 68 | $3 \times 10^2$ |
| 2 | 1 hour | 60°C | thermal | 0 | 0 | $6 \times 10^5$ |
| 3 | 1 min | 60°C | thermal | 200 | 190 | $1 \times 10^7$ |
| 4 | 1 min | 95°C | thermal | 195 | 170 | $9 \times 10^6$ |
| 5 | 1 min | 60°C | microwaves | 282 | 225 | $2 \times 10^5$ |
| 6 | 1 min | 37°C | microwaves | 287 | 230 | $7 \times 10^5$ |
| 7 | 1 min | 95°C | microwaves | 265 | 220 | $9 \times 10^4$ |
| 8 | 1 min | 25°C | ultraviolet (20mW/sec/cm²) | 280 | 232 | $6 \times 10^2$ |
| 9 | 1 min | 37°C | microwaves + UV | 280 | 230 | 60 |
| 10 | 1 min | 60°C | microwaves + UV | 275 | 229 | 0.2** |
| 11 | 1 min | 95°C | microwaves + UV | 250 | 215 | 0 |

*When irradiating with microwaves we give only the temperature at the exit of the processing unit.
**2 virus plaques in 10 ml of tested plasma.

watt/cm³) inside the processing cavity while the plasma temperature at the exit of the unit was reduced down to 75°C before entering into a second cooling unit. As can be seen in Table II under such conditions complete destruction of the viruses was achieved with one minute exposure time.

under pressure. This approach would have very little chance to succeed because as previously stated a higher temperature even coupled with a shorter processing time will certainly impair milk flavor through proteins denaturation.

The synergistic ultraviolet-microwaves irradiation

TABLE II

| Biocidal Energy | Temperature (Contact time- 1 minute) | Fibrinogen (mg/%) | Prothrombin 2-stage (units/ml) | $T_3$-phage plaque (counts/ml) |
|---|---|---|---|---|
| Standard Controls | | 300–600 | 300 | $2 \times 10^7$ |
| Thermal energy | 95°C | 195 | 170 | $9 \times 10^6$ |
| Microwaves | 95°C | 265 | 220 | $9 \times 10^4$ |
| Ultraviolet | 25–30°C | 280 | 230 | $7 \times 10^2$ |
| Microwaves + UV | 95°C* | 250 | 215 | 0 |
| Microwaves + UV | 75°C* | 261 | 225 | 0 |
| Thermal + UV | 95°C | 190 | 160 | $3 \times 10^2$ |

*Plasma temperature at the exit of the processing unit before entering final cooling unit.

EXAMPLE 2

In the conventional pasteurizing method, milk is heated to a temperature of 143°F and held at this temperature for 30 minutes. The milk is then cooled for storage or bottling. The bacteria content is usually reduced to about 1 percent of the starting value. When a longer time is used, a cooked flavor is usually present and the apparent cream volume is reduced. More modern methods of milk pasteurization (flash pasteurization) involve higher temperatures and shorter contact time. They consist, for instance, of exposing milk to temperatures of the order of 161°F during 16 seconds.

It is, of course, important that any pasteurizing process would not change the flavor of the milk. Previous experiments (G. H. Brown, Radio-Frequency Heating 1947) have shown that it is often a condition very difficult to fulfill. For instance at 190°F a heating time as short as 0.06 sec is sufficient to denature proteins and give a pronounced cooked flavor. Recent studies conmethod which is the object of the present invention would provide a solution to the milk pasteurization problem. Thanks to the biocidal contribution of ultraviolet photons one can maintain the level of microwave energy sufficiently high to quickly destroy all microorganisms in a significant volume of milk but low enough not to affect the heat labile proteins which control the taste of milk.

Figure 12:
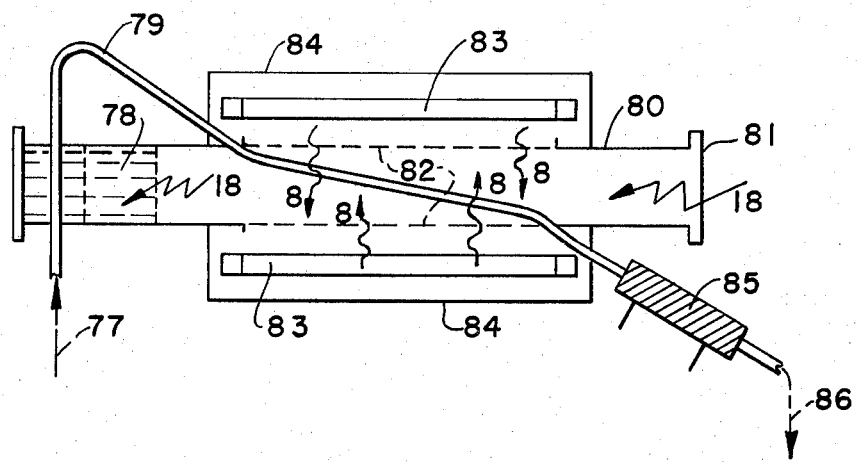

Let us recall that ultraviolet irradiation alone (Buttolph et al, Gen Elect 1953) never provided a satisfactory economic solution to milk pasteurization even when applied to thin moving films. To conduct our experiments we used two continuous wave magnetron generators with a maximum output of 1.5 kW at 2450 MHZ and 915 MHz. The generator was coupled to a rectangular wave guide (4.3 inches × 2.15 inches at 2450 MHz) as shown in FIGS. 11 and 12. Processed raw milk was pumped under pressure (60 psi) into a vycor glass pipe placed across the middle of the waveguide obliquely at an angle of 11°. The milk flowed through a rectangular cross section of approximately 0.1 inch height and 1 inch width. In most experiments the milk flow rate varied between 50 cc/min and 150 cc/min. The raw milk was either introduced at a temperature of 65°F or at 105°F when preirradiated by passage through a wedge-shaped resevoir acting as a terminating load (see left end of wave guide in FIGS. XI and XII).

The source of ultraviolet radiation consisted, for instance, of two identical Hanovia Letheray, cold cathode tubes, each with an output of 7.3 watts at 2537 A. As seen in FIG. 12 each tube was placed in the focal region of a parabolic highly polished stainless steel reflector. The first tube was placed a few inches above the wave guide while the second was positioned in symetrical position below the wave guide. To enable the ultraviolet photons to penetrate through the wave guide walls and reach the milk layer flowing inside the vycor glass pipe we used two windows on the upper and lower side of the wave guide. These windows were made of perforated stainless steel (holes diameter 0.026 inch) and due to the large wave length of the microwaves they stopped the passage of any radiation (perforated plate transmission: 70 db). The stainless apertures were however large enough to let penetrate more than 50% of the ultraviolet photons which could thus create at the liquid interface a minimum energy level of 10 mW/sec/cm$^2$.

It would have been indeed also possible to insert the ultraviolet radiators inside the wave guide but this approach would have created numerous problems such as perturbating the microwave standing wave field (thus producing instability and an extra load on the magnetron) and over heating various parts and components of the UV cathode lamp which may then require special cooling devices.

As can be seen in Table III with several different sets of experimental conditions (increased flow rate and temperature) we discovered that the biocidal activity of combined ultraviolet and microwaves irradiation is greater than the sum of the biocidal activities of the two separate agents. Bacterial counts were conducted according to the procedure defined by the American Public Health Association Inc. (Standard Methods for the Examination of Dairy Products 12th Ed.).

One of the main drawbacks of the previous attempts made to pasteurize raw milk with microwaves alone was the difficulty to maintain a constant temperature in a continuous flow process. Since the water content of normal milk is 86 to 88%, an expansion effect was often observed which rendered difficult temperature control. Variations of 2 degrees Fahrenheit around the critical temperature of 180°F had shown a drastic effect on the bacterial count. The synergistic method object of the present invention demonstrated in our tests that the increased biocidal activity (see tests numbered 4, 8 and 11 in Table III) provided a safety margin high enough to overcome such a problem.

Another series of experiments (Tests 9, 10 and 11) conducted in a larger wave guide with a lower microwave frequency (915 MHz) confirmed that the same biocidal synergistic effect could be reproduced at a different wave length.

The problem of pasteurizing or decontaminating liquids is indeed widespread in the food industry. The synergistic method hereabove described for milk processing could be used for treating beer, fruit juices, soft drink beverages, liquid protein food, serum and other fluids which contain heat labile components which should not be affected during the biocidal procedure. The main practical advantage of our new

TABLE III

| | | Milk Pasteurization Tests (Continuous Flow method) | | | |
|---|---|---|---|---|---|
| Test No. | Type of Irradiation | Flow rate (cc/min) | Milk inlet temperature (°F) | Milk outlet temperature (°F) | Final bacterial count (per ml) sheet processed |
| Control | none | 50 and 150 | 65 | 66 | 5.10$^6$ and 6.10$^6$ |
| 1 | ultraviolet | 50 | 65 | 180 | 1 × 10$^3$ |
| 2 | microwaves* | 50 | 65 | 180 | 2 × 10$^2$ |
| 3 | UV + microwaves | 50 | 65 | 180 | 0 |
| 4 | UV + microwaves | 50 | 65 | 178 | 0 |
| 5 | ultraviolet | 150 | 101 | 180 | 3 × 10$^5$ |
| 6 | microwaves | 150 | 101 | 180 | 10$^2$ |
| 7 | UV + microwaves | 150 | 101 | 180 | 0 |
| 8 | UV + microwaves | 150 | 101 | 178 | 0 |
| 9 | microwaves (915 MHz) | 150 | 101 | 180 | 1.5 × 10$^2$ |
| 10 | UV + microwaves (915 MHz) | 150 | 101 | 180 | 0 |
| 11 | UV + microwaves (915 MHz) | 150 | 101 | 178 | 0 |

*When not indicated between parenthesis the microwave frequency was 2450 MHz. The UV frequency in all tests corresponded to the 2537 A wave length.

invention lies therefore more in its capability to provide a safer way to destroy microorganisms at the lowest possible temperature rather than in its increased biocidal effect at a known temperature.

EXAMPLE 3

Figure 13:
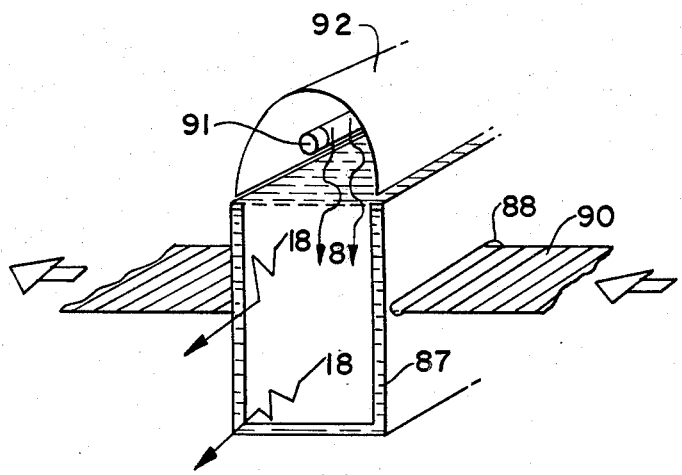

As shown in FIG. 13 the biocidal synergistic method object of our invention can also be used to microbiologically decontaminate on a batch or continuous basis thin solids such as plastic sheets, films, fabrics, textiles, papers, etc. In this case the film or sheet passes through a slot cut sideways in the wave guide parallel to wave propagation. The ultraviolet photon source emits in a direction perpendicular to the travel direction of the moving sheet. A perforated metal plate replaces the upper or lower (or both) wall of the wave guide, which is not slotted, to allow ultraviolet penetration while stopping microwave energy leakage.

To demonstrate the biocidal efficiency of our method we processed a thin sandwich sheet made of an upper and lower layer of polyethylene film containing in between several spores strips (Spordex). The Bacillus subtilis population of each strip was said to average 100,000. The maximum output in the wave guide (cross section 2 × 4 inches at 2450 MHz) was approximately 650 watts while the ultraviolet intensity at sheet interface was 22 mW/sec/cm$^2$. The contact time inside the processing wave guide was reduced to a maximum of two seconds with a view to avoid any major thermal effect.

After irradiation the spores strips between the plastic sheets were removed under sterile conditions and individually placed in labelled test tubes, each containing 25 cm$^3$ of sterile fluid thyoglycollate medium. The same number of control strips from the same batch left unirradiated were also placed into test tubes containing the same culture medium. Two incubation times (24 and 168 hours) were used in our experiments. Table IV shows the results of 8 series of tests. From our data (Tests No. 1 and 2) one can see that both ultraviolet and microwaves (Tests No. 3 and 4) irradiation exhibited some biocidal activity when used separately. However it is only when combined (Tests No. 5 and 6) that these two forms of electromagnetic radiation gave a 100% kill of B. subtilis spores under our experimental conditions. Tests No. 7 and 8 conducted under vacuum show that the described process is also highly efficient when operating below one atmosphere inside the processing area. In such a case the slots to introduce the thin films are designed to hold the negative pressure inside the wave guide while the microwave beam is penetrating inside the wave guide through a plastic window. Both techniques are well known to the man of the art. It is of course obvious that contact time and radiant energy levels are a function of the nature and physical size of the film or sheet processed in the method object of our invention.

to energize the tube from a standard electrical line (alternative to 60 Hz current). As shown by the arrow 8 the emission of ultraviolet photons is perpendicular to the liquid flow. FIG. 1a is a sectional view of the irradiator at the level $h$—$h'$ and clearly shows the disposition of the capillaries 3 around the ultraviolet quartz jacket 1.

Figure 2:
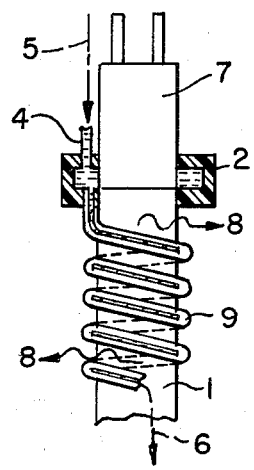

FIG. 2 is another configuration to flow the processed liquid around the same ultraviolet tube. Here again the liquid 4 enters the hollow plastic sleeve 2 but it is fed under slight pressure into a single capillary 9 of helicoidal shape which is wrapped at close distance around the quartz jacket tube. The direction of flow is shown by the arrows 5 and 6.

Figure 3:
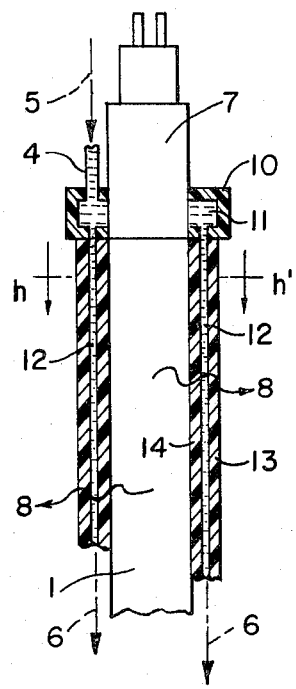

FIG. 3 is another configuration using the same ultraviolet tube. In this set up the processed liquid 4 is distributed by a plastic sleeve 10 of slightly different shape. At the lower part of the plastic sleeve a circular opening 11 lets the liquid flow directly into a narrow circular slot 12 which results from the space left between two vycor glass cylinders 13 and 14. The vycor glass cylinder 14 (or any other ultraviolet transparent material) has an internal diameter calculated to fit perfectly with the external diameter of the tube quartz jacket 1. The space left between the glass cylinders 13 and 14 is comprised between 0.1 and 1 millimeter. As shown by the arrows 8 the ultraviolet photons are emitted at right angles with the direction of flow 5 and 6 of

TABLE IV

Plastic Film Sterilization
Experimental conditions:
  Contact time — 2 seconds, UV intensity: 22 mW/sec/cm$^2$
  Microwaves output 650 watts
  Frequency: 2450 MHz

| Test No. | Type of irradiation | Incubation time in hours | Number of irradiated test tubes with growth | Number of control test tubes with growth |
|---|---|---|---|---|
| 1 | Ultraviolet | 25 | 3 | 30 |
| 2 |  | 168 | 6 | 30 |
| 3 | Microwaves | 24 | 15 | 30 |
| 4 |  | 168 | 18 | 30 |
| 5 | UV + Microwaves | 24 | 0 | 30 |
| 6 |  | 168 | 0 | 30 |
| 7 | UV + Microwaves (⅛ Atm. Vacuum) | 24 | 0 | 30 |
| 8 | UV + Microwaves (⅛ Atm. Vacuum) | 168 | 0 | 30 |

Having described three specific examples of our synergistic biocidal method, we shall now describe, by way of non limiting examples, several embodiments of apparatuses which enable using said invention.

Figure 1A:
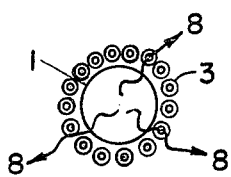
Figure 3A:
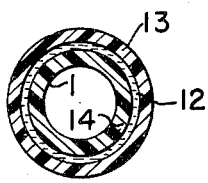

FIG. 1 shows the schematic cross section of an irradiator which consists of a high intensity low vapour pressure mercury type tube with a quartz jacket 1. At one end of the ultraviolet tube a hollow plastic sleeve 2 is fastened which maintains in rigid position several vycor glass capillaries tubes 3. These capillaries tubes are parallel to the quartz envelope of the ultraviolet tube and positioned at a short distance of (one or several millimeters). The capillaries are connected at the other end of the tube to a second hollow plastic sleeve which is not shown on FIG. 1 for the sake of clarity. Each capillary tube made of a material transparent to ultraviolet has an internal diameter comprised between 0.1 and 1 millimeter. The liquid to be processed is fed in 4 at the upper portion of the plastic sleeve and it flows through the capillaries in the direction shown by the arrows 5 and 6. The upper section 7 of the ultraviolet tube contains the transformer and the electrical system the processed liquid in the annular ring 12. FIG. 3a is a cross sectional view of this arrangement at the level $h$—$h'$.

Figure 4:
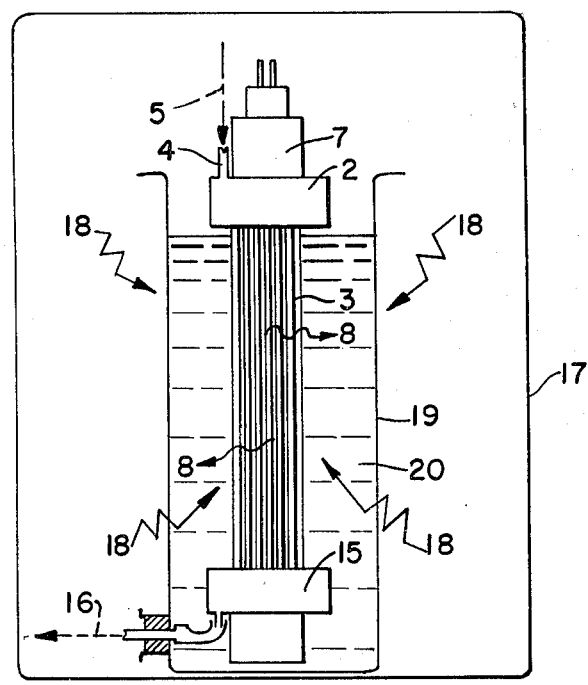

As seen in the following FIG. 4 the irradiated liquid is collected in another hollow plastic sleeve 15 at the other end of the ultraviolet tube and moved outside the processing area (arrow 16). FIG. 4 shows a vertical sectional view of the irradiator placed inside the microwave cavity (or wave guide) 17. For the sake of clarity we showed a few arrows 18 to symbolize the microwave field inside the cavity. As well known in an oven cavity such as represented in FIG. 4 the microwaves field will be multidirectional due to the fact that a mechanical stirrer is used to bounce the energy beam in several directions thus avoiding standing waves and "hot" spots into the cavity. Since all the capillaries 3, 9 and cylindrical glass sleeves 13, 14 are made of material (plastics, ceramics, glass) chosen to be highly transparent both to ultraviolet and microwaves the liquid will be submitted to both forms of radiant energy when flowing from inlet 4 to outlet 16. In FIG. 4 we also show a glass beaker 19 which contains a liquid 20 having good heat transfer characteristics and is realtively lossless (Dow Corning oil 200). This arrangement minimizes the temperature raise inside the irradiator. As shown later the liquid to be processed is pumped in at a slight pressure (35 to 60 psi), it enters the irradiator as shown by arrow 5 and leaves it as shown by arrow 16. Any irradiator of the type described in FIGS. 1, 2 and 3 can be placed inside the microwave cavity 17 shown in FIG. 4. According to the type of processed liquid and depending upon its characteristics one can conduct the biocidal procedure with or without the heat transfer liquid system (19, 20).

Figure 5:
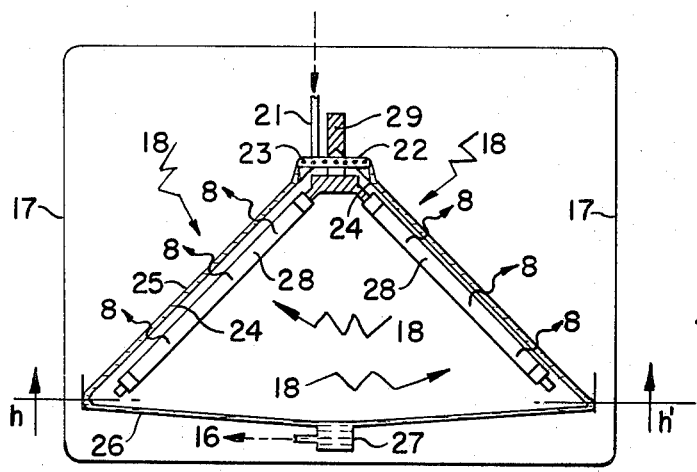

FIG. 5 is a vertical cross sectional view of another embodiment for carrying out the method object of our invention. As can be seen the irradiator is placed inside a microwave oven cavity whose walls are shown in 17. The liquid is fed into a plastic or glass tube 21 connected to a circular hollow manifold 22 with multiple apertures 23. The liquid is distributed by the manifold on the upper side of a cone 24 made of glass or material transparent to ultraviolet. The liquid flows from the top of the cone down to its wider lower portion 25 where it is collected into a shallow container of larger diameter 26. On the axis and at the lower portion of this container a smaller cup 27 accumulates the processed liquid before its evacuation (arrow 16). While flowing downward along the cone the liquid flow is adjusted to produce a film whose thickness is smaller than 1 millimeter. The ultraviolet irradiation of this thin film of liquid is provided by several ultraviolet tubes 28 which are fastened to a holding manifold 29 positioned at the top of the cone. The ultraviolet tubes operate at a close distance (a few millimeters) under the transparent glass cone and parallel to it. This insures a high degree of transmission of the ultraviolet energy through the slow moving thin liquid film. As previously stated the entire irradiator is located inside the cavity of a microwave type oven and all its components are made of material permeable to microwave energy (polypropylene, polyethylene, teflon, glass, etc).

Figure 6:
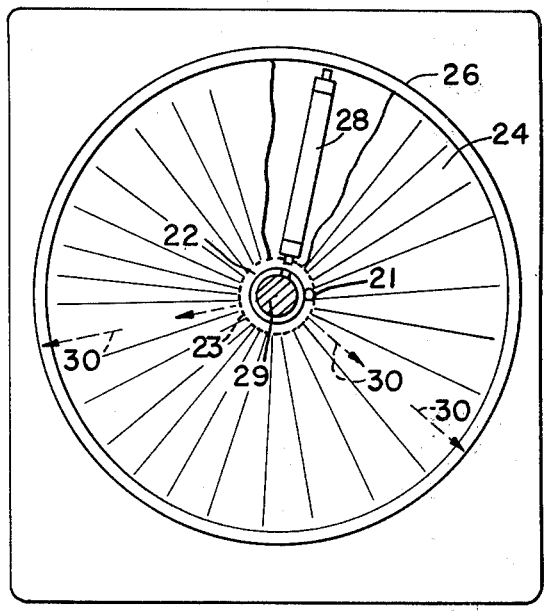

FIG. 6 is a cross sectional and projected view of the apparatus shown in FIG. 5 at the level $h-h'$. Also shown in projection are the liquid inlet 21, the liquid manifold 22, the supporting manifold 29, and an ultraviolet tube 28 in an open section of the cone. Arrows 30 show the liquid flow direction from the upper manifold 22 down to the collecting vessel 26.

Figure 7:
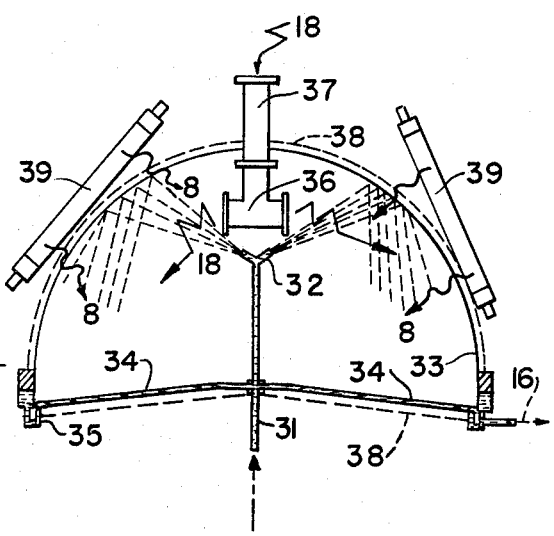

FIG. 7 shows another vertical cross sectional arrangement to continuously process a microbiologically contaminated liquid fed through a hollow pipe 31 in an upward direction under slight pressure. At the end of the feeding pipe the liquid is sprayed into fine droplets (1 to 100 microns diameter) by means of several nozzles 32. The atomized droplets are projected against the walls of a plastic or glass dome 33 transparent to ultraviolet radiation 8. After impingement against the dome walls most liquid droplets fall at the bottom of the processing cell where they are collected as a liquid film 34. The bottom of the processing cell is slanted (a few degrees angle) to allow continuous removal of the decontaminated liquid through a circular throat or through 35 which also acts as a liquid seal. The decontaminated liquid leaves the processing area as shown by the arrow 16. The microwave beam is introduced into the processing area by a two-port wave guide 36 fastened at right angles to the main wave guide 37. With a view to avoid any electromagnetic radiation leak through the plastic dome a second dome 38 made of perforated metal (holes diameter 0.026 inch) is fastened on the outside. The metal screen 38 allows a penetration of at least 50% of the ultraviolet energy radiated by the low vapor pressure mercury type tubes located in 39. As shown by the arrows 8 (ultraviolet) and 18 (microwaves) the sprayed liquid which has a large surface area submitted to the biocidal radiations is quickly decontaminated before collection in 16 at the base of the processing cell. For the sake of clarity the apparatus shown in FIG. 7 is of revolution around a vertical axis but other equivalent designs could be efficiently used without being of revolution around the vertical pipe axis.

Figure 8:
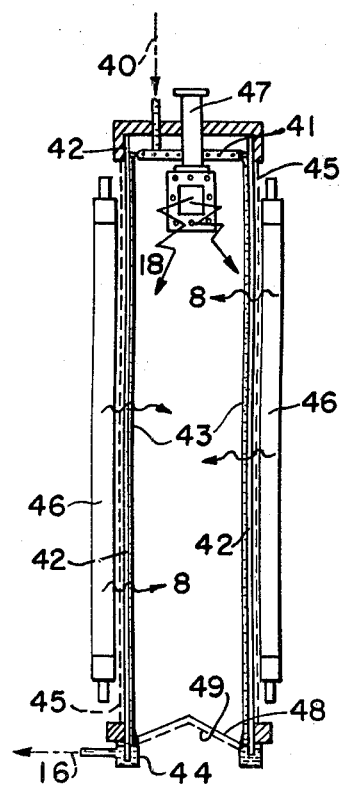

FIG. 8 is the vertical cross section of another apparatus, object of our invention, which utilizes the processing of falling films in a downward direction. The contaminated fluid is fed in 40 at the top of the unit through a plastic or glass manifold 41 with several holes to project the liquid sideways against the walls of a vertical vycor glass or plastic container 42. The processed liquid 43 flows down and is collected at the bottom 44 of the cell through a "sealed throat" device before it is pumped out as shown by arrow 16. By controlling the liquid input and the cell height one can adjust the thickness of the falling liquid film to values smaller than 1 mm. Here again, as in the apparatus of FIG. 7, electromagnetic radiation leaks are eliminated by using a perforated metal screen 45 placed between the ultraviolet sources 46 and the external side of the plastic or glass walls 42 on which the fluid flows inside the cell. The beam of microwave energy 18 is introduced into the processing area by the slots of a wave guide shown in 47. The cross sectional view of FIG. 8 illustrates the principle of a unit which could be designed either as of revolution (cylindrical shape) or of parallelepipedic shape. According to the nature of the material used to build the lower portion of the cell 48 one may need another perforated screen as shown in 49 to avoid electromagnetic leaks through the processing unit bottom.

FIGS. 9 and 10 show schematic cross sections of two apparatuses which use a well known approach for thin film processing. What is unique in the new apparatuses is the fact that they operate inside a microwave tuned cavity or wave guide 17. As can be seen the processed liquid in FIG. 9 is fed in 50 into a shallow container 51. It adheres by capillarity over the surface of an ultraviolet transparent material of cylindrical hollow shape 52 which rotates clockwise. The ultraviolet tube 53 in a fixed position on the axis emits radially as shown by arrows 8 and thus the photons penetrate uniformly through the thin liquid film 54. Said film 54 is removed from the cylinder by a sharp blade 55 at the end of the irradiation before it is collected in the throat 56 and pumped out in the direction 57.

FIG. 10 shows another approach also based upon the processing of a liquid film on the external side of a rotating hollow cylinder 58. The liquid is fed as shown by arrow 59 at the top of an ultraviolet transparent cylinder 58 rotating in a clockwise direction. The ultraviolet tube 60 is placed on the main axis of the hollow rotating cylinder and enables a uniform irradiation of the liquid film before it is removed from the cylinder's outer surface by a knife 61. The processed liquid is collected in the throat 62 before being pumped out in the direction 63. The whole unit operates inside a wave guide or tuned cavity 17.

FIGS. 11 and 12 show an experimental set up successfully used to decontaminate or pasteurize milk. It can indeed be used with other liquids such as fruit juices, soft drink beverages, liquid food proteins etc. The applicator seen in FIG. 11 consists essentially of a rectangular wave guide 64 (4.3 inch ×2.15 inch for a 2450 MHz emission) connected by a flange 65 on the right side to a continuous wave magnetron. The liquid to be processed enters 66 into a vycor glass pipe and leaves the radiation chamber in 67. To minimize mismatch reflections into the wave guide the vycor glass 68 is placed across the middle of the wave guide obliquely at an angle of approximately 11 degrees. The central portion 69 of the vycor glass pipe has a flat cross section as seen in 70. It could also be designed as seen in FIGS. 11a and 11b. In the schematic 11a one can see that the liquid is circulated into a series of parallel capillaries tubes 71 which are submitted at right angles to an intense flux of ultraviolet photons (arrows 8). In the arrangement seen on FIG. 11b the processed liquid flows under slight pressure into a shallow flat basin 72 where it is directly exposed in thin layer 73 to the ultraviolet radiation. The direction of microwave flow is shown by arrows 18. The ultraviolet source 74 is positioned at a few inches outside the wave guide in the focal region of a metal polished reflector 75. A perforated stainless steel window 76 replaces a section of the upper horizontal wall of the wave guide 64. The ultraviolet tube emits through this perforated plate 76 whose holes are small enough (0.026 inch for instance) to stop any radiation leak.

FIG. 12 is a longitudinal cross section of a unit of the same type with a few modifications. The liquid first enters the applicator in 77 and it is slightly warmed by heat exchange inside a wedge shaped reservoir 78 made of plexiglass and acting as a terminating water load. The vycor glass pipe 79 bends and enters again into the active portion of the wave guide 80 which is connected to the magnetron generator on the right side by the flange 81. Arrows 8 and 18 show the direction of ultraviolet and microwave flows. Two perforated stainless steel plates 82 allow the penetration of the ultraviolet photons emitted by two ultraviolet tubes 83 fastened on the focal line of the metal reflectors 84. After processing, the liquid is quickly cooled down in the heat exchanger 85 before final collection and sampling in 86.

Figure 13A:
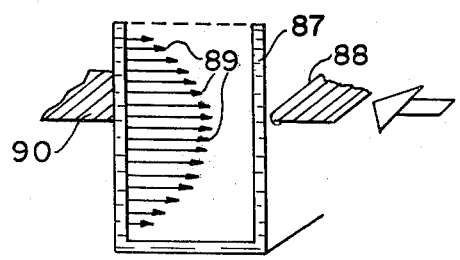

FIG. 13 shows another apparatus to apply the method object of our invention to the continuous treatment of sheet or thin solid films. It consists of a cross sectional rectangular wave guide 87 with two opposite slots 88 cut on the vertical walls of the wave guide. The slots are parallel to the direction of the microwave flow 18, they are of such a size that they do not allow any radiation leak outside the wave guide. Arrows 89 in FIG. 13a given an indication of the direction of the electromagnetic field inside a cross section of the wave guide. The thin layer of material (textile, paper, etc) 90 is moving through the slots 88 in the region of maximum field intensity. The upper side of the wave guide is made of a perforated stainless steel plate to let the flux of ultraviolet photons 8 penetrate inside the processing area. The ultraviolet flux 8 impinges at right angles on the moving processed film 90. For the sake of clarity only one ultraviolet source 91 with its reflector 92 is shown in FIG. 13 but it is obvious that a more efficient apparatus could use double ultraviolet irradiation from the upper and lower side of the wave guide.

Several units of the type shown in FIG. 13 could also be used in series with a system known to the man of the art as folded wave guide.

Figure 14:
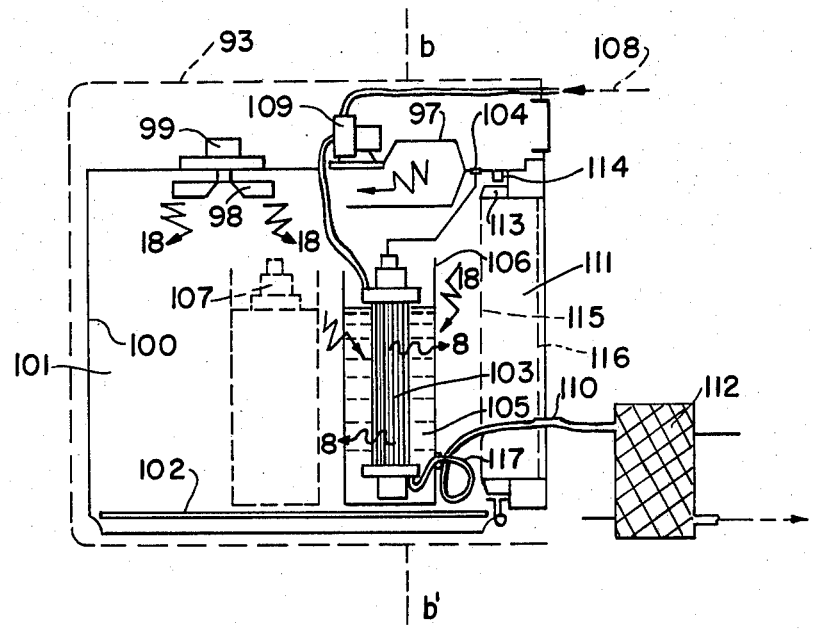
Figure 15:
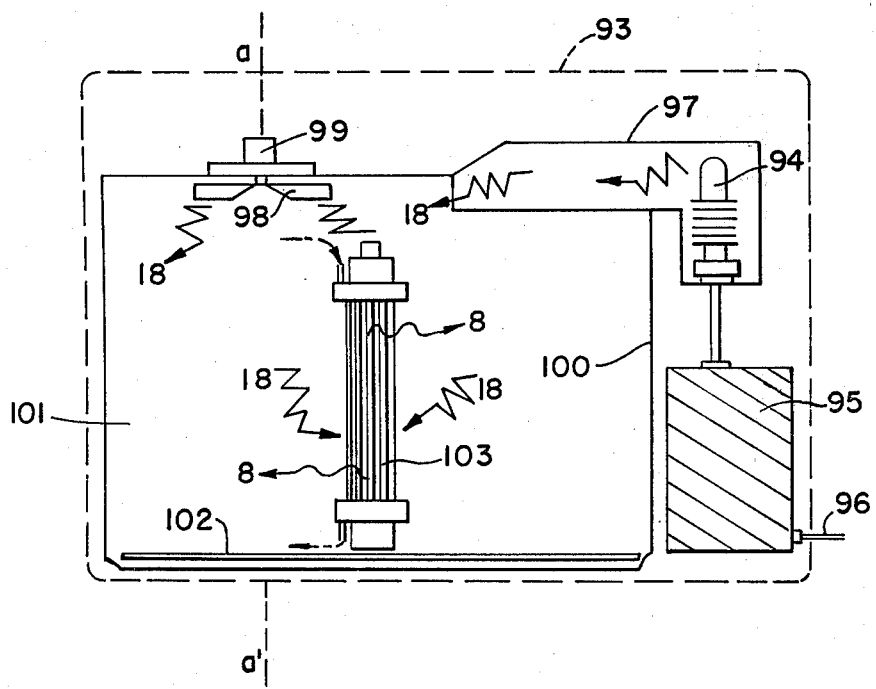

FIG. 14 is a simplified cross sectional side view of the processing apparatus shown in FIG. 15 taken along the line $a—a'$ with the front door in a closed position. FIG. 15 is a cross sectional front view of the apparatus along the line $b—b'$ as shown in FIG. 14.

As can be seen the processing apparatus consists of a metal housing 93 quite similar to those used today in microwave ovens. Located within the housing are the main components of the microwave and ultraviolet sources. They comprise the magnetron 94 which, with the help of the transformer, rectifier and magnetic field circuit (all contained in the power pack 95), converts the 60 cycle AC current from the line 96 into microwave energy. The high power beam of microwave energy is contained in a wave guide 97 and directed against the blades 98 of a fan 99 which rotates at a few revolutions per minute. The fan 99, often called stirrer, reflects the power beam bouncing it off the walls 100 of the tuned microwave cavity 101. Arrows 18 symbolize the multidirectional microwave field inside the cavity. At the bottom of the cavity 101 one can see a Pyrex type glass plate 102 transparent to microwaves, which is fastened approximately one inch above the metal bottom of the processing cavity. Placed on the plate 102 in a vertical position we show one processing cell 103 of the type previously described in FIGS. 1, 2, 3 and 4. Alternative electric current (to activate the ultraviolet lamp fastened on the axis of the cell) is fed through the line 104. Arrows 8 symbolize the direction of the ultraviolet photons emission, perpendicular to the liquid flow in the capillaries tubes. In FIG. 14 we show in solid line a processing cell 103 which is operating inside a relatively lossless liquid 105 contained in a glass beaker 106. According to needs one can indeed use a cell without heat exchanger (as shown in FIG. 15) or several processing cells of either type in series or parallel. A second processing cell 107 is shown for this purpose in dotted lines on FIG. 14.

The liquid to be processed enters the apparatus in 108, it is moved into the irradiating cell 103 by a pump 109 and leaves the microwave cavity through an opening 110 inside the front door 111. After leaving the processing unit the liquid may enter in some cases into a supplementary cooler 112 shown in FIG. 14. The drop-down door 111 is equipped with a quarter wave choke seal 113 and an absorber seal 114 to decrease radiation leaks. The choke cavity is filled for instance with polypropylene while the secondary seal is made of vinyl loaded with carbon black. The door 111 is equipped with a viewing screen 115 made of perforated stainless steel (diameter holes 0.0265 inches). In some cases added protection is given to the door by the addition of a glass or optically transparent plastic plate 116. The use of a coiled plastic tube 117 to move the liquid through the unit enables opening the door at the end of irradiation without disturbing the processing cell position.

Of course a unit of the type shown in FIGS. 14 and 15 has several standard safety features such as door interlock switches which are not shown for the sake of clarity since they are the kind of safety features well known to the man of the art. Also not shown for the same reason are other common features such as timer, dial lights, start switches, stirrer shield and blower used to cool the microwave tube.

The unit shown in FIGS. 14 and 15 enables processing up to 250 cc/min of blood plasma with an average microwave energy density of 0.025 watts/cm$^3$ and an ultraviolet intensity of the order of 25 milliwatts per square centimeter. It is obvious that within the scope of our invention and according to the desired results one can use any microwave frequency whose wave length is comprised between 1 cm and 35 cm, and operate at any ultraviolet frequencies inside the 40 A to 3100 A wave length range. It must also be understood that the present invention can be applied to variable volumes and liquids flows at different temperatures or at multiple pressures (including operation under vacuum) and that, still without departing from the scope of the invention, the structural details of the described embodiments of apparatus, the dimensions and the shapes of its members (such as the ultraviolet lamp or the magnetron) and their arrangements (vertical or horizontal position of the processing cells) may be modified, and that certain members may be replaced by other equivalent means (magnetron replaced for instance by klystron or amplitron tubes).

The embodiments of the invention in which an exclusive property or privilege is claimed are defined as follows:

1. A rapid biocidal synergistic method of sterilizing or pasteurizing liquid containing living microorganisms such as pathogenic gram positive and gram negative bacteria, hydrophilic and lipophilic viruses and pathogenic fungi while maintaining the temperature below about 100°C, comprising establishing a thin body of liquid to be sterilized having a thickness in the range of from about 0.05 mm to about 13 mm, and subjecting the body of liquid to simultaneous irradiation with ultraviolet energy having a wave length of from about 40 Angstroms to about 3100 Angstroms and an intensity at liquid interface greater than 1 milliwatt/sec./cm$^2$, and with microwave energy having a density not greater than about 0.025 watt/cm$^3$ and a wave length of from about 1 cm to about 35 cm.

2. The method of claim 1 in which the microwave energy density inside the processing cavity is higher than 0.001 watt per cubic centimeter of irradiated volume.

3. The method of claim 1, wherein the liquid comprises blood serum, whereby the microorganisms are destroyed without affecting heat labile proteins or plasma components.

4. The method of claim 1, wherein the liquid is a comestible, whereby the microorganisms are destroyed without substantially denaturing heat labile components present in the liquid.

5. The method as defined in claim 1, wherein the liquid being treated is caused to flow continuously through a processing cavity, and including the step of cooling the liquid during and after the processing of the liquid.

6. A method as defined in claim 1, wherein said step of establishing a thin body of liquid comprises the step of spraying the liquid into a processing cavity.

7. A method as defined in claim 1, wherein said step of establishing a thin body of liquid comprises rotating a cylindrical surface in a body of liquid to be treated, whereby a thin film of liquid is established and retained on the surface of the cylindrical surface.

8. A method as defined in claim 1, wherein said step of establishing a thin body of liquid comprises flowing said liquid through a capillary tube.

* * * * *